US011695868B2

(12) United States Patent
Swerdlow (10) Patent No.: US 11,695,868 B2
(45) Date of Patent: Jul. 4, 2023

(54) SYSTEM AND METHOD FOR VIDEO-ASSISTED PRESENCE DETECTION IN TELEPHONY COMMUNICATIONS

(71) Applicant: Zoom Video Communications, Inc., San Jose, CA (US)

(72) Inventor: Nick Swerdlow, Santa Clara, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/236,421

(22) Filed: Apr. 21, 2021

(65) Prior Publication Data

US 2022/0345569 A1    Oct. 27, 2022

(51) Int. Cl.
*H04M 3/42*    (2006.01)
*G06V 40/16*   (2022.01)
(Continued)

(52) U.S. Cl.
CPC ...... *H04M 3/42365* (2013.01); *G06V 40/166* (2022.01); *H04L 65/1096* (2013.01);
(Continued)

(58) Field of Classification Search
CPC .. H04M 3/42365; H04M 3/5175; H04M 3/58; H04M 2201/41; H04M 2203/4509; H04M 3/567; H04M 3/5315; H04M 3/42068; G06V 40/166; H04L 65/1096; H04L 65/1104; H04N 7/183
See application file for complete search history.

(56) References Cited

U.S. PATENT DOCUMENTS 8,185,583 B2 *  5/2012  Tiruthani ......... H04N 21/44218
                                              709/204
8,861,537 B1 * 10/2014  Braithwaite ............ H04L 51/56
                                              370/401
(Continued)

FOREIGN PATENT DOCUMENTS

CN    109729300 A  *  5/2019  ......... H04L 65/1073
CN    106104476 B  *  8/2019  ............... G06F 8/61
(Continued)

OTHER PUBLICATIONS

International Search Report and Written Opinion dated Jul. 21, 2022 in corresponding PCT Application No. PCT/US2022/024737.

*Primary Examiner* — Akelaw Teshale
(74) *Attorney, Agent, or Firm* — Young Basile Hanlon & MacFarlane, P.C.

(57) ABSTRACT

Video-assisted presence detection is used to enhance a user experience in telephony communications. Image data, video data, or both, from a camera are used to determine whether a user is present at their device before a call is transferred to him or her. The video-assisted presence detection can be implemented based on a privacy setting. For example, one implementation allows a system to have partial access to the camera to perform a scan to detect that there is a human present without capturing facial information, and without identifying that person. Another implementation allows the system to have partial access to the camera to scan the a face of a user, but not have access to the video feed of the camera. Another implementation allows the system to have full access to the camera.

20 Claims, 7 Drawing Sheets

(51) Int. Cl.
*H04L 65/1104* (2022.01)
*H04L 65/1096* (2022.01)
*H04M 3/51* (2006.01)
*H04M 3/58* (2006.01)
*H04N 7/18* (2006.01)

(52) U.S. Cl.
CPC ....... *H04L 65/1104* (2022.05); *H04M 3/5175* (2013.01); *H04M 3/58* (2013.01); *H04N 7/183* (2013.01); *H04M 2201/41* (2013.01)

(56) References Cited

U.S. PATENT DOCUMENTS

| | | | |
|---|---|---|---|
| 8,934,719 B1 | 1/2015 | Denise | |
| 9,760,796 B2 | 9/2017 | Manabe et al. | |
| 10,264,547 B1* | 4/2019 | Zhong | H04W 4/02 |
| 10,375,266 B2 | 8/2019 | Wexler et al. | |
| 10,498,904 B1* | 12/2019 | Sandler | H04M 3/4936 |
| 11,190,642 B1* | 11/2021 | Yanes | H04M 3/4288 |
| 11,423,470 B1* | 8/2022 | Boyd | H04N 7/15 |
| 2002/0167488 A1 | 11/2002 | Hinckley et al. | |
| 2003/0002646 A1 | 1/2003 | Gutta et al. | |
| 2012/0008753 A1* | 1/2012 | Burnett | H04L 51/56 |
| | | | 379/90.01 |
| 2015/0138076 A1 | 5/2015 | Chen | |
| 2017/0272269 A1* | 9/2017 | Siminoff | H04M 11/025 |
| 2019/0364396 A1 | 11/2019 | Jeong | |
| 2020/0226552 A1 | 7/2020 | Evans et al. | |
| 2020/0334264 A1* | 10/2020 | Lewis | G06F 18/22 |

FOREIGN PATENT DOCUMENTS

| | | | | |
|---|---|---|---|---|
| EP | 2422497 A1 | 2/2012 | | |
| JP | 2014021619 A | 2/2014 | | |
| WO | WO-2019103745 A9 * | 4/2020 | ......... | H04M 3/4935 |

* cited by examiner

SYSTEM AND METHOD FOR VIDEO-ASSISTED PRESENCE DETECTION IN TELEPHONY COMMUNICATIONS

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and methods for video-assisted presence detection in telephony communications.

One aspect of this disclosure is a system for video-assisted presence detection in telephony communications. The system includes a first device that is associated with a private network. The first device is configured to communicate via a UCaaS platform. The system includes a second device that is associated with the private network. The second device is configured to communicate with the UCaaS platform. The second device may include a camera. The second device may be configured to detect a user presence. The user presence may be detected based on data captured by the camera. The second device may be configured to transmit a notification to the first device. The notification may indicate detection of the user presence. The first device may be configured to transfer a call to the second device based on the detection of the user presence. The call may be transferred to the second device using session initiation protocol (SIP) signaling.

Another aspect of this disclosure is a method for video-assisted presence detection in telephony communications. The method includes detecting a user presence. The user presence may be detected based on data captured by a camera of a first device. The first device may be associated with a private network. The first device may be configured to communicate via a UCaaS platform. The method may include transmitting a notification to a second device. The second device may be associated with the private network. The second device may be configured to communicate via the UCaaS platform. The notification may include an indication of the detected user presence. The method may include transferring a call to the first device based on the detection of the user presence. The call may be transferred using SIP signaling.

Another aspect of this disclosure includes a non-transitory computer-readable medium configured to store instructions that when executed by a processor cause the processor to initiate a camera on a first device. The first device may be associated with a private network. The first device may be configured to communicate via a UCaaS platform. The processor may be configured to perform a scan. The scan may be based on a privacy setting. The scan may include data obtained from the camera. The processor may be configured to determine whether a human presence is detected based on the data obtained from the camera. The processor may be configured to transmit a notification to a second device. The second device may be associated with the private network. The second device may be configured to communicate via the UCaaS platform. The notification may be transmitted based on the determination of whether the human presence is detected. If the human presence is detected, the processor may be configured to transfer a call from the second device to the first device. The call may be transferred using SIP signaling. If a human presence is not detected, the processor may be configured to retain the call at the second device.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A software platform, such as a UCaaS platform, may include several communications services integrated over a network. The communications services may include telephony services. Telephony services, or otherwise referred to telephony communications, include a digital status referred to as presence, which typically is represented using a status indicator. The status indicator may be conveyed visually, aurally, and/or by other means. The status indicator may appear next to a user's name on a contacts list, for example, and indicates a status of the user, for example, one of on the phone, away/idle, do not disturb, roaming with a mobile device (e.g., away from the desk, but still reachable), and available, in which available typically indicates that the user is logged in.

The available indicator, however, is not very precise in that is does not accurately indicate whether the user is actually available to receive a communication or other message or notification. For example, the user may have just walked away to take a quick break to get coffee or visit the washroom. In one particular example, an operator, such as a receptionist or an auto attendant, may receive a call for a user and seek to transfer the call to him or her. In another example, the operator may receive a call at a call center for an agent at the call center. In these examples, the receptionist or operator may perform a cold transfer where they simply transfer the call without first checking to see if the user or agent is present and available to take the call. Alternatively, the receptionist or operator may perform a warm transfer, also known as a consultative transfer, where the caller is placed on hold and the receptionist separately calls the user or agent to determine if they are present, and ask whether they are available to take the call. The warm transfer process, therefore, is used to verify the presence of the user or agent before a call is transferred and thus does not resolve the imprecisions of the status indicator of the user or agent.

Implementations of this disclosure address problems such as these using video-assisted presence detection in telephony communications. Image data, video data, or both, may be used to enhance the determination of whether a user is present before a call is transferred to him or her. The video-assisted presence detection may be implemented using varying degrees of privacy settings. For example, one implementation option may provide a user to opt in for the system to have partial access to the camera of the client device to perform a scan to detect that there is a human being present without capturing facial information, and without identifying who that person specifically is. Another implementation option may provide a user to opt in for the system to have partial access to the client device to scan the user's face, but not have access to the video feed of the camera. Another implementation option may provide a user to opt in for the system to have full access to the camera of the client device.

In any of these implementation options, the system may be configured to also identify a number of people through a camera of the client device. In this way, for example, the system may indicate some privacy information to the receptionist to indicate that the person is or may be in a conference. Other examples may include where a non-receptionist co-worker transfers a call, sends an invitation for the user to join a conference, and the like. The privacy information may be indicated either directly by sharing the video feed, by sharing indications of specific persons identified, or by sharing a number of people without specifying identity information.

In addition, any of these implementation options may include a check step before access to the camera of the client device is granted, for example using a mobile device of the user that may be running a client application. In an example, a user may have both the mobile device running the client application and a separate desktop device, such as a phone or computing device, which runs the client application. The proximity of the mobile device to the desktop device may be measured, for example, by the client application running on the mobile device communicating with the client application running on the desktop device, to determine whether the user is close enough to their desktop device. Accordingly, in such a case, the camera may be used to check presence in any of the implementation options above after first detecting the proximity of the mobile device to the desktop device. In some cases, the distance value measured from the proximity detection may be compared to a threshold, for example, to identify whether the user is within a set distance range. In other cases, the system may detect whether the mobile device is within a geofence defined based on a location of the desktop device.

Figure 1:
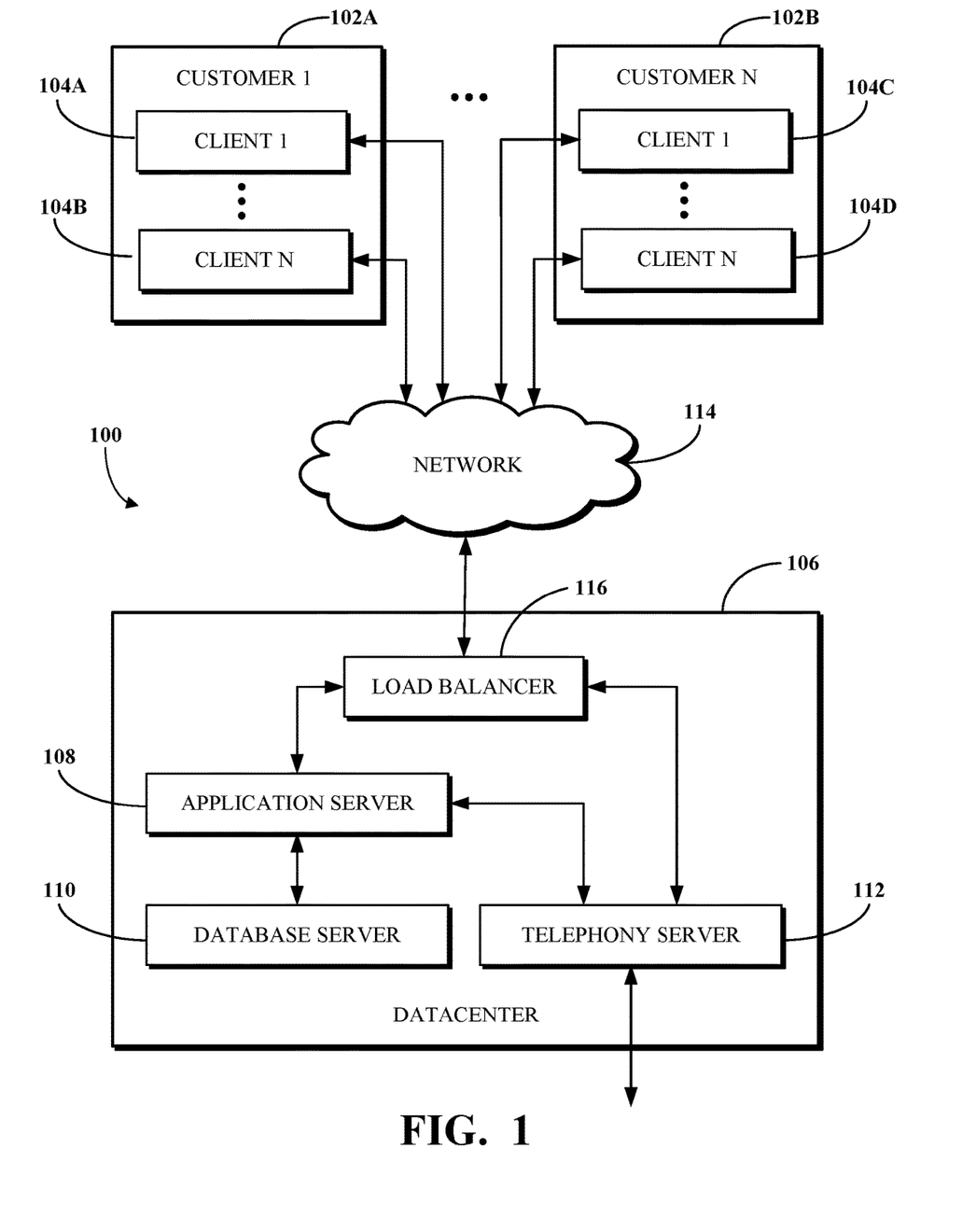
FIG. 1 is a block diagram of an example of an electronic computing and communications system.

To describe some implementations in greater detail, reference is first made to examples of hardware and software structures used to implement video-assisted presence detection in telephony communications. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network, for example, a network 114. In particular, the telephony server 112 includes a SIP zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOW-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOW-enabled, the telephony server 112 may initiate a SIP transaction via a VOIP gateway that transmits the SIP signal to a public switched telephone network (PSTN) system for outbound communication to the non-VOW-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
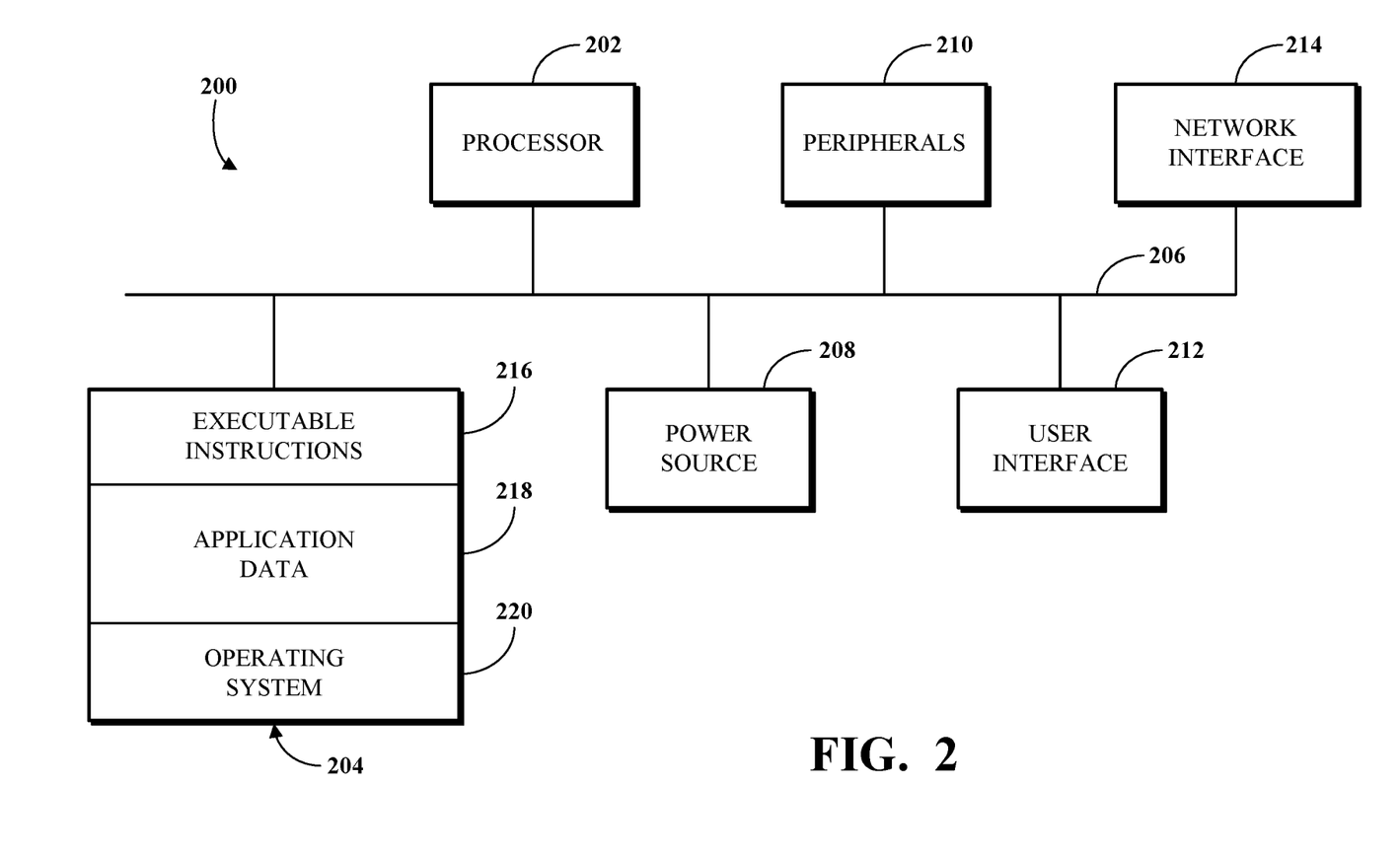
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
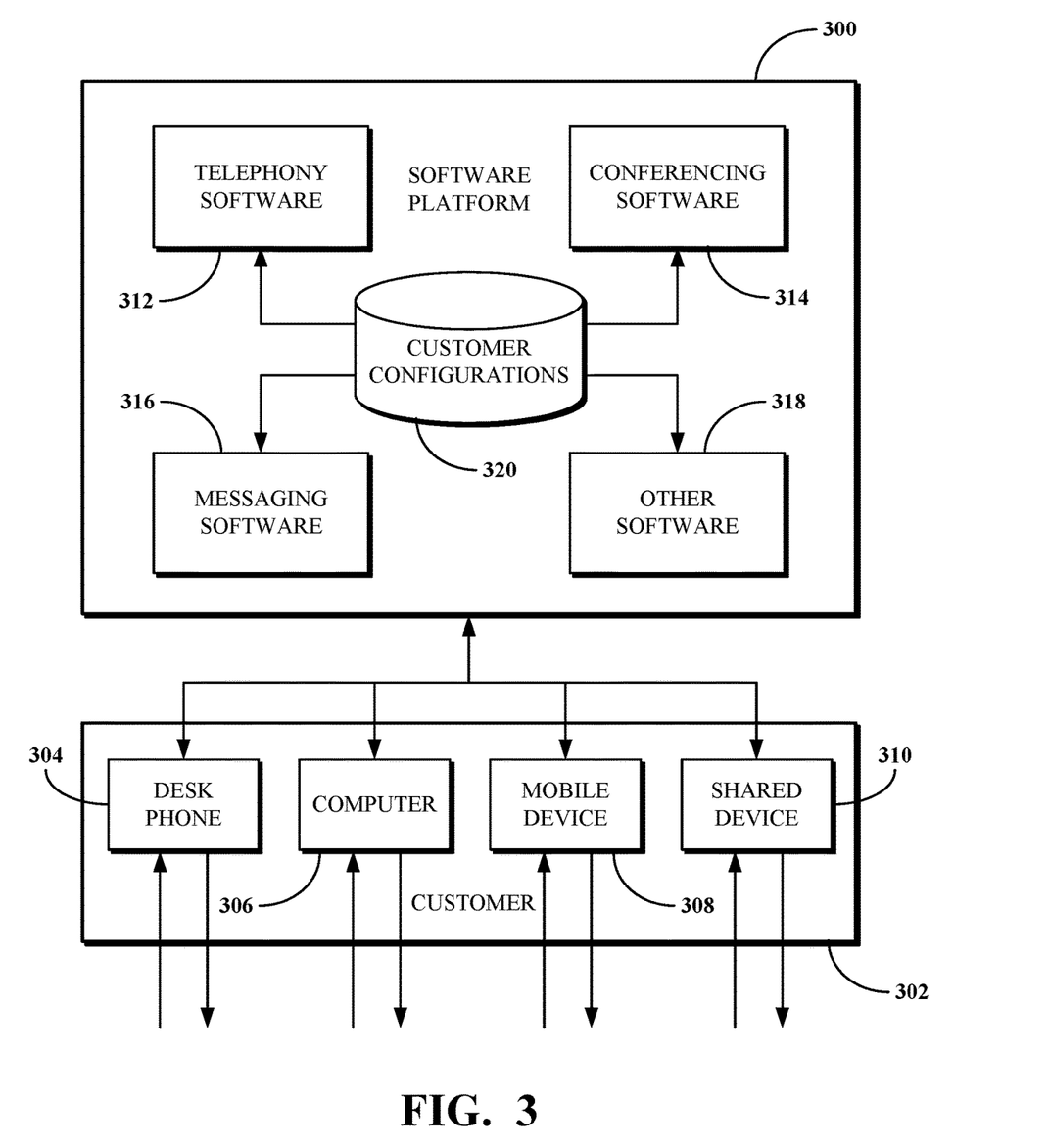
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOW-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 where same includes telephony features.

The telephony software 312 further enables phones which do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include functionality for video-assisted presence detection in telephony communications.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304-310.

Figure 4:
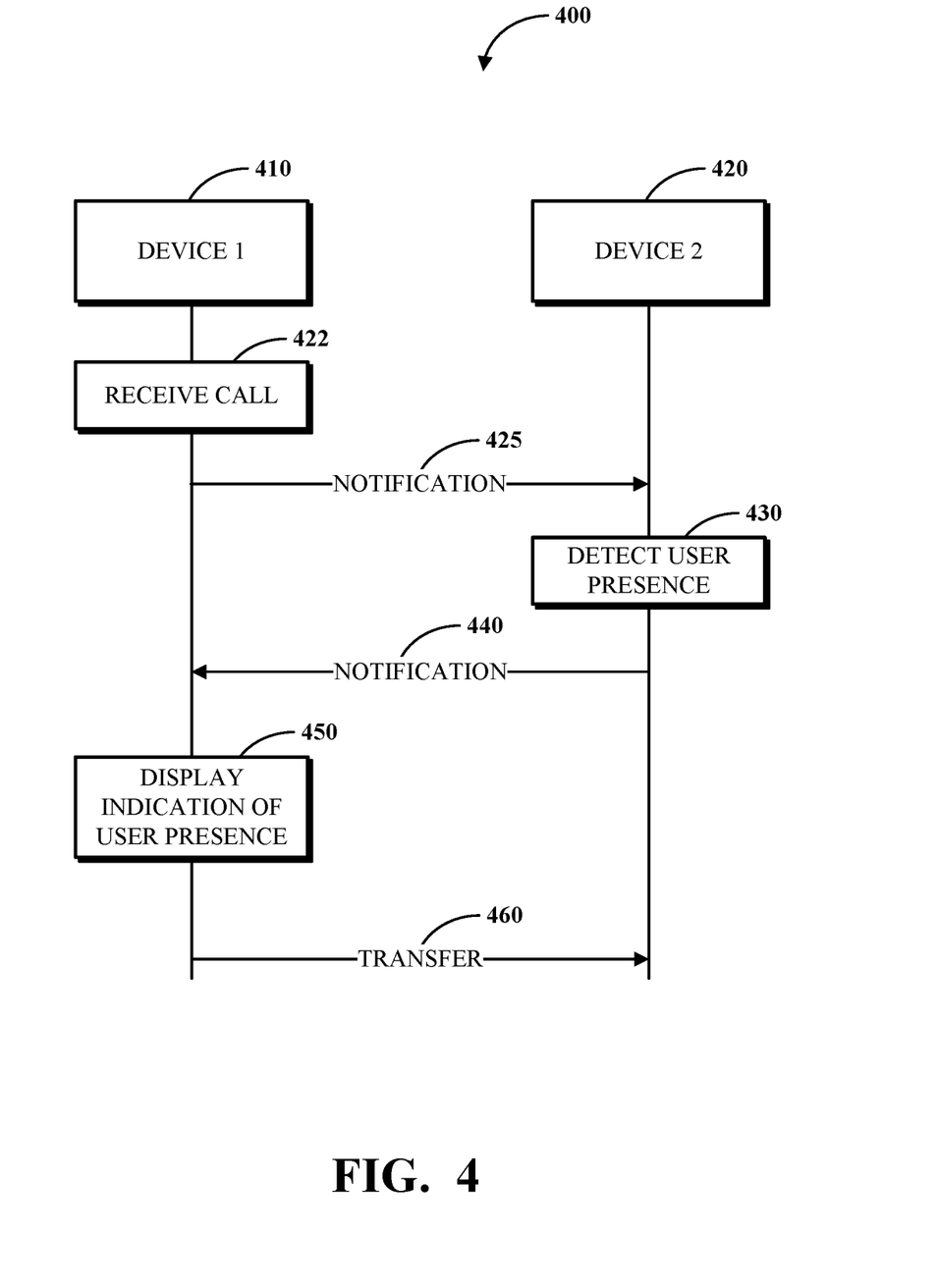
FIG. 4 is a flow diagram of an example of a system for transferring calls using video-assisted presence detection.

FIG. 4 is a flow diagram of an example of a system 400 for transferring calls using video-assisted presence detection. The system 400 includes a first device 410 and a second device 420. The first device 410 and second device 420 are referred to herein as devices for simplicity and clarity, and may include clients, such as client 104A and client 104B, respectively, shown in FIG. 1. The first device 410 and the second device 420 may be associated with a private network or domain associated with a customer, and configured to communicate via a UCaaS platform, such as software platform 300 shown in FIG. 3. For example, the devices may be implemented in an office setting where the first device 410 is for an operator, such as a receptionist or auto attendant, and the second device 420 is a user device configured to receive transferred calls from the first device 410. In another example, the devices may be implemented in a call center setting where the first device 410 is an operator or auto attendant, and the second device 420 is an agent device configured to receive transferred calls from the first device.

As shown in FIG. 4, the first device 410 is configured to receive 422 a call. The call may be intended for the user of the second device 420. In response to receiving the call, the first device 410 is configured to transmit a notification 425 to the second device 420. The notification 425 may include an indication of the call, metadata associated with the call, a request for user a user status or status indicator, or any combination thereof.

The second device 420 is configured to detect 430 a user presence. The second device 420 may be configured to detect the user presence in response to receiving the notification 425. The user presence may be detected based on data captured by a camera of the second device 420. The data captured by the camera of the second device 420 may include image data, video data, or both. The second device 420 may detect 430 the user presence in accordance with a privacy setting selected by the user. In some implementations, the privacy setting may be selected by another client device operator associated with the same UCaaS platform customer, or by another operator or entity. For example, the privacy setting may be established based on company policy rather than based on individual user preference. In one example, the user may select a privacy setting that allows the system to have partial access to the camera of the second device 420 to perform a scan to detect that there is a human being present without capturing facial information, and without identifying who that person specifically is. In this example, the second device 420 or another device, such as the application server 108 shown in FIG. 1, may use an artificial intelligence (AI) tool to detect a head zone, a body zone, or both. The head zone may be an area of an image that is associated with the data that includes at least a portion of the head or face of the user. The body zone may be an area of the image that is associated with the data that includes at least a portion of the body of the user. Identification of a head zone and a body zone may indicate that a human is present at the second device 420. This example carries a false positive potential where the human detected at the desk is not the person for whom the incoming call is being transferred. In some cases where an AI tool has been trained to recognize voices using voice print matching, the AI tool can be used to indicate when someone who is not the person for whom the call is transferred answers the call.

In another example, the user may select a privacy setting that allows the system to have partial access to the camera of the second device 420 to scan the user's face, but not have permission to transmit the video feed of the camera. In this example, the second device 420 or another device, may be configured to recognize the user's face, but does not actually display any image or video data from the camera on the first device 410, and the system simply verifies whether the user is there or not. In this example, the specific user may be identified, such as by using an AI tool trained for face detection.

In another example, the user may select a privacy setting that allows the system to have full access to the camera of the second device 420. In this example, the system is configured to determine that the specific person is at their desk in front of the second device 420 and thus can distinguish between the specific person and other people, such as by using an AI tool trained for face detection. In this case, the system may or may not display the image or video data from the camera on the first device 410, for example, upon request from the receptionist or non-receptionist co-worker such as where the receptionist or non-receptionist co-worker receives a call to be transferred to the user.

In response to detecting the user presence, the second device 420 is configured to transmit a notification 440 to the first device. In some cases, the notification 440 may be transmitted when the identity of the user is confirmed. The second device 420 may be configured to confirm the identity of the user by performing voice print matching, fingerprint scanning, or some other technique that does not require the use of image or video data. The notification 440 may include an indication that the user is present, a number of people present, a noise level, or any combination thereof. In an example where the number of people present exceeds a threshold, the indication may indicate that the user is present and unavailable, for example if the user is in a crowded room. In an example where a noise level exceeds a threshold, the indication may indicate that the user is present and unavailable, for example if the user is on a noisy subway. The indication may be based on the selected privacy setting. Based on the selected privacy setting, for example, the indication may include an identity of the user, an image of the user, a video feed of the user, or it may be an indication that the user is present without any identifying information. In some examples, the notification may include an indication of the number of people present, a noise level, or both.

The first device 410 is configured to receive the notification 440 and display 450 the indication of the user presence on a display of the first device 410. In some cases, the indication may be a light or color indication on a hard or soft key of the first device 410. For example, a hard key on the first device 410 may be assigned to the user, and the hard key may be illuminated using a color indication, such as green, when the user is detected as present. The first device 410 may transfer 460 the call to the second device 420 based on the detection that the user is present at the second device 420. The call transfer may be initiated by an input received at the first device 410. The input may be a press of a button such as the hard key or soft key on the first device 410. In the case of an auto attendant, the call may be transferred automatically based on the detection that the user is present at the second device 420 without receiving any input. The call may be transferred using SIP signaling.

Figure 5:
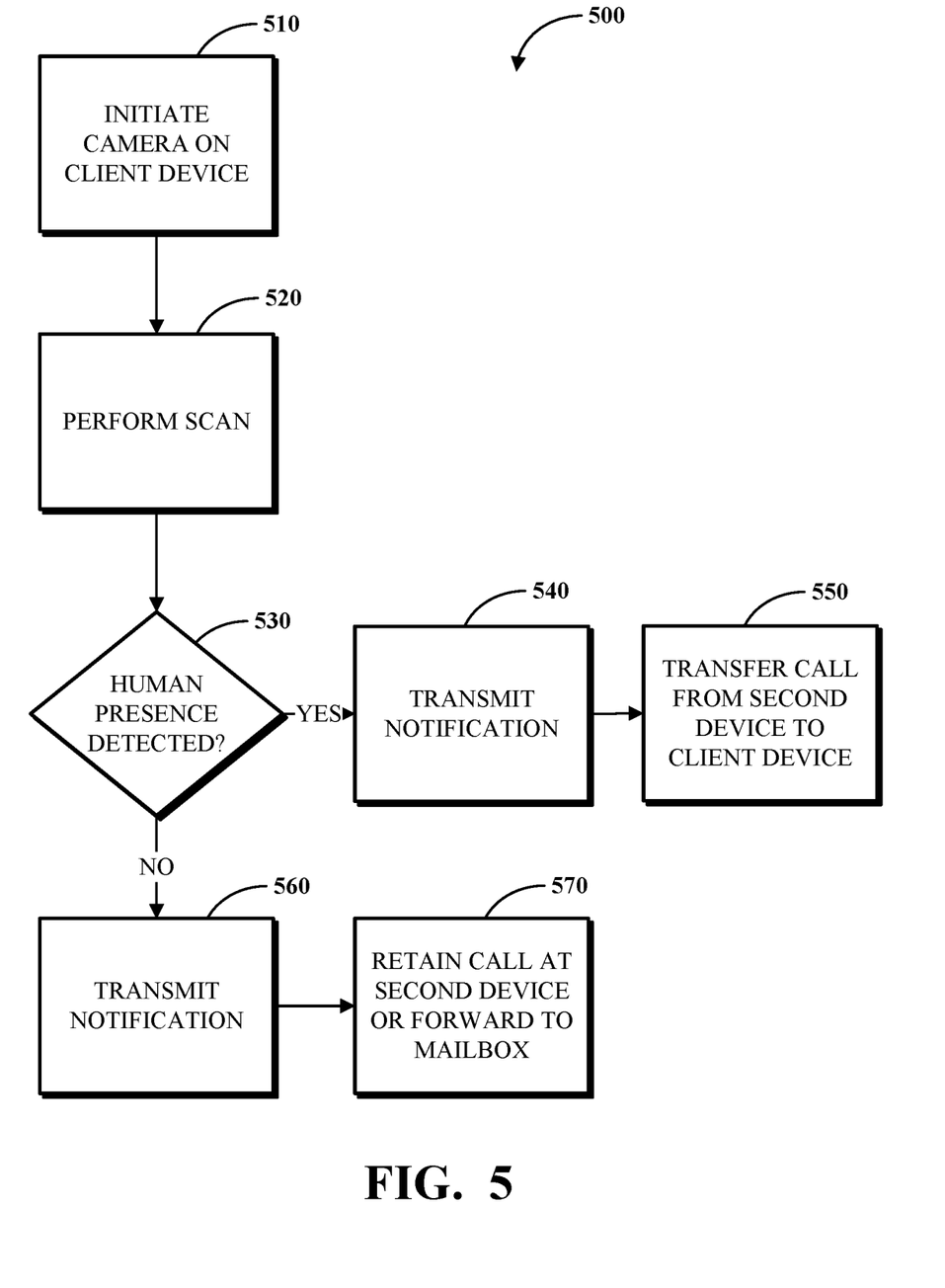
FIG. 5 is a flowchart of an example of a method for video-assisted presence detection in telephony communications.
Figure 6:
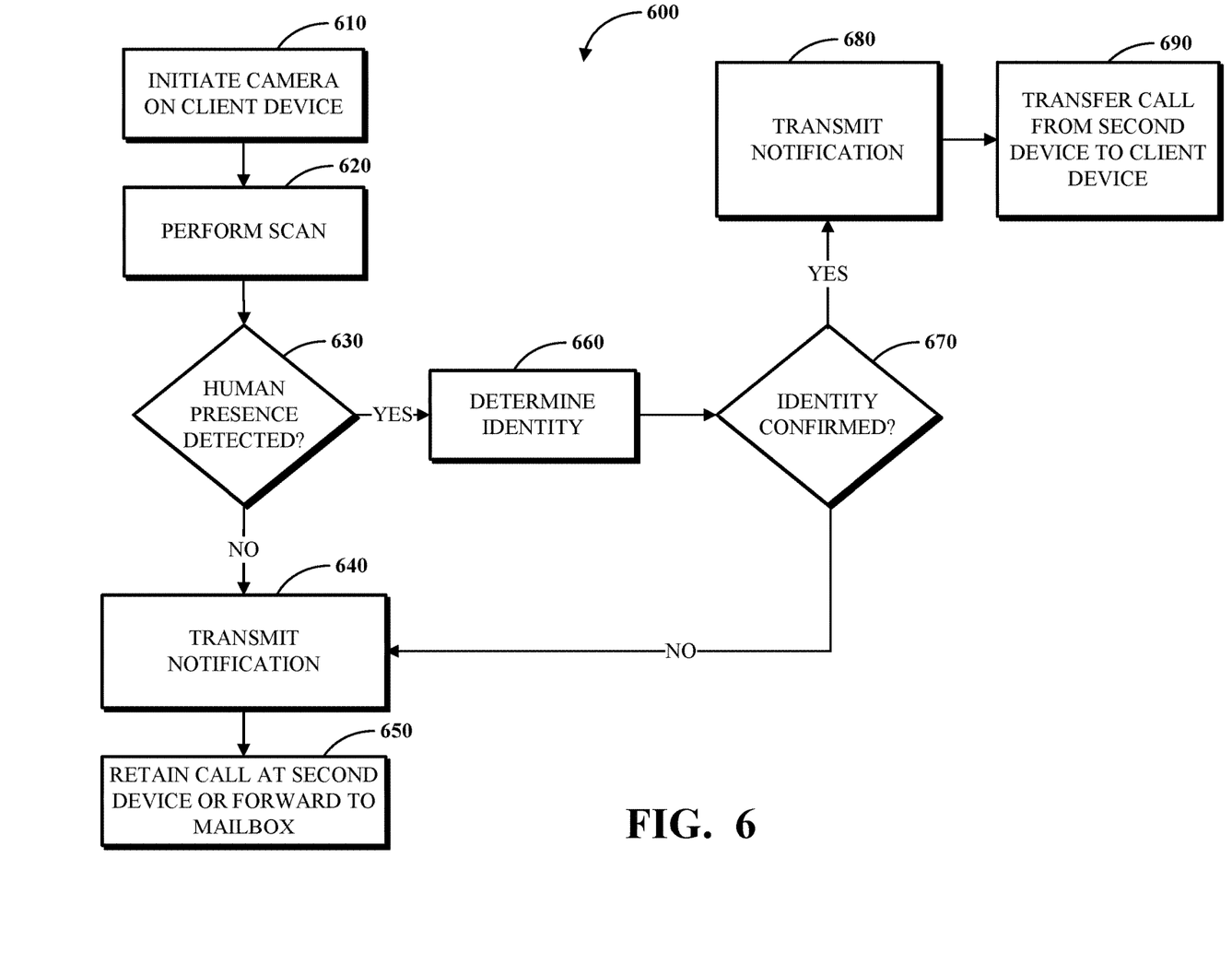
FIG. 6 is a flowchart of an example of another method for video-assisted presence detection in telephony communications.
Figure 7:
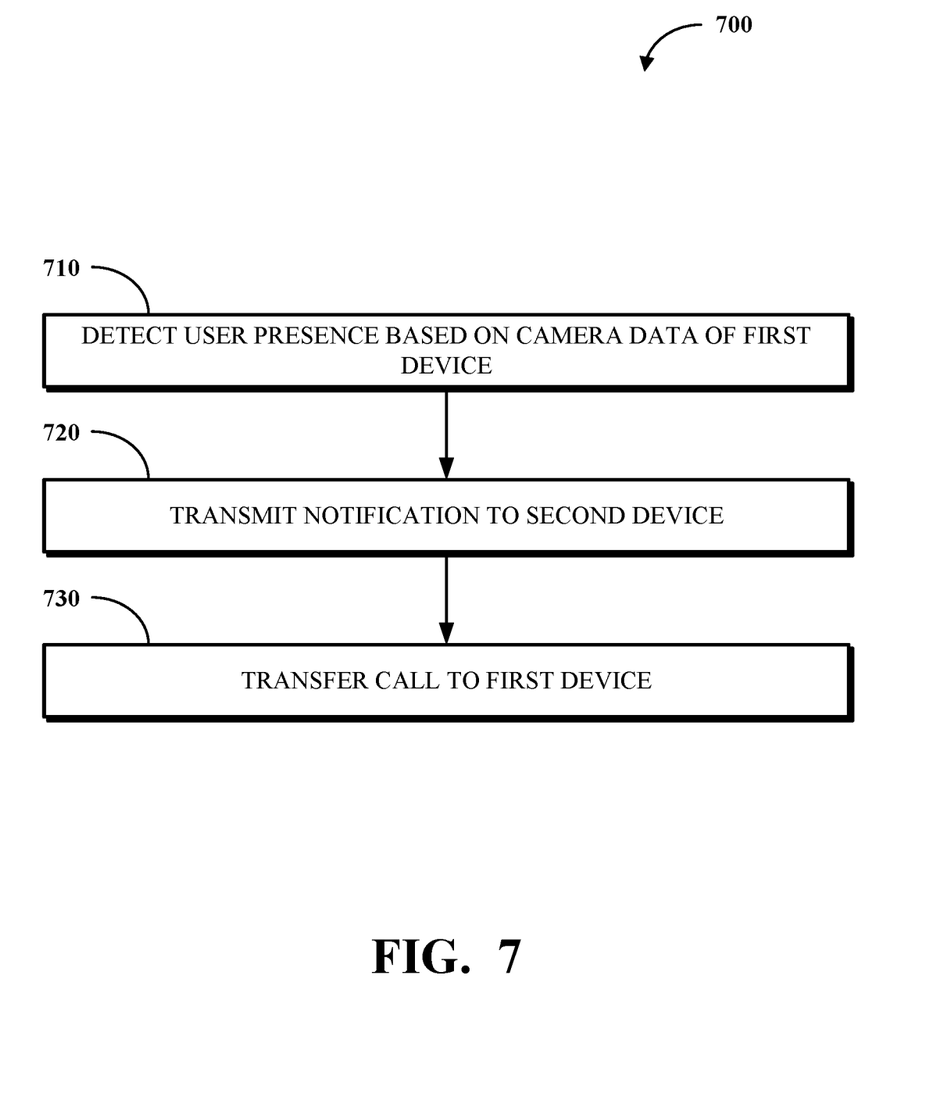
FIG. 7 is a flowchart of an example of another method for video-assisted presence detection in telephony communications.

To further describe some implementations in greater detail, reference is next made to examples of methods which may be performed by or using a system for voice-assisted presence detection in telephony communications. FIGS. 5-7 are flowcharts of examples of methods for performing voice-assisted presence detection in telephony communications. The methods can be executed using computing devices, such as the systems, hardware, and software described with respect to FIGS. 1-4. The methods can be performed, for example, by executing a machine-readable program or other computer-executable instructions, such as routines, instructions, programs, or other code. The steps, or operations, of the methods or other techniques, methods, processes, or algorithms described in connection with the implementations disclosed herein can be implemented directly in hardware, firmware, software executed by hardware, circuitry, or a combination thereof.

For simplicity of explanation, the methods depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 5 is a flowchart of an example of a method 500 for video-assisted presence detection in telephony communications. The method 500 includes initiating 510 a camera on a client device, such as the second device 420 shown in FIG. 4. In an example, the camera may be powered on and in standby mode when the client device is logged into the software platform. When the camera is in standby mode, the camera may be powered on and the image sensor may be activated, though not recording images or video. In an example, initiating 510 the camera on the client device may include the image sensor detecting motion or a change in a lighting condition in a field of view of the camera to switch from standby mode to an active mode to perform 520 a scan to detect a user presence. In another example, initiating 510 the camera may include detecting a noise at the client device, for example using a microphone of the client device or a microphone of the camera. In another example, initiating 510 the camera may include detecting the proximity of a mobile device to the client device to switch from standby mode to an active mode to perform 520 a scan to detect a user presence. In another example, the camera may periodically perform 520 a scan to detect a user presence. The periodicity of performing 520 the scan in this example may be configurable by the user or system administrator, and may be configured to occur every few seconds or longer intervals. In yet another example, the camera may continuously perform 520 a scan to detect a user presence.

Performing 520 the scan may include obtaining data from the camera, such as image data, video data, or both. The scan may be performed 520 based on a selected privacy setting. For example, the user may select a privacy setting that allows the system to have partial access to the camera of the client device to perform 520 the scan to detect that there is a human being present at the client device without capturing facial information, and without identifying who that person specifically is. In this example, the client device may use an AI tool to detect a head zone, a body zone, or both. Detection of a head zone and/or a body zone may indicate that a human is present at the client device.

The method includes determining 530 whether a human presence is detected based on the scan. For example, if a head zone and/or body zone are detected, the system determines 530 that a human being is present at the client device. If it is determined 530 that a human presence is detected, the method 500 includes transmitting 540 a notification. In some cases, the presence status may be updated to available. The notification may include an indication of the presence status, and the notification may be based on the selected privacy setting. For example, the indication of the updated presence status may indicate that the user is present at the client device without identifying who that person is. The method 500 includes transferring 550 a call from one device to another device, such as, for example, from a second device to the client device in response to the notification.

If it is determined 530 that a human presence is not detected, the method 500 includes transmitting 560 a notification. In some cases, the presence status may be updated to unavailable. The notification may include an indication of the presence status. The method 500 includes retaining 570 a call at the second device or forwarding the call to a mailbox, such as a voice mailbox of the user.

FIG. 6 is a flowchart of an example of another method 600 for video-assisted presence detection in telephony communications. The method 600 includes initiating 610 a camera on a client device, such as the second device 420 shown in FIG. 4. In an example, the camera may be powered on and in standby mode when the client device is logged into the software platform. When the camera is in standby mode, the camera may be powered on and the image sensor may be activated, though not recording images or video. In an example, initiating 610 the camera on the client device may include the image sensor detecting motion in a field of view of the camera to switch from standby mode to an active mode to perform 620 a scan to detect a user presence. In another example, initiating 610 the camera may include detecting the proximity of a mobile device to the client device to switch from standby mode to an active mode to perform 620 a scan to detect a user presence. In another example, the camera may periodically perform 620 a scan to detect a user presence. The periodicity of performing 620 the scan in this example may be configurable by the user or system administrator, and may be configured to occur every few seconds or longer intervals. In yet another example, the camera may continuously perform 620 a scan to detect a user presence.

Performing 620 the scan may include obtaining data from the camera, such as image data, video data, or both. The scan may be performed 620 based on a selected privacy setting. For example, the user may select a privacy setting that allows the system to have partial access to the camera of the client device to perform 620 the scan to detect that there is a human being present at the client device by capturing facial information, and without permission to transmit the video feed of the camera. In this example, the client device may be configured to recognize the user's face, but does not actually display any image or video data from the camera on another device, such as the first device 410 shown in FIG. 4, and the system simply verifies whether the user is there or not. In this example, the specific user may be identified, such as by using an AI tool trained for face detection.

In another example, the user may select a privacy setting that allows the system to have full access to the camera of the client device. In this example, the system is configured to determine that the specific person is at their desk in front of the client device and thus can distinguish between the specific person and other people, such as by using an AI tool trained for face detection. In this case, the system may or may not display or transmit the image or video data from the camera on another device, such as the first device 410 shown in FIG. 4, for example, upon request from the receptionist such as where the receptionist receives a call to be transferred to the user.

The method includes determining 630 whether a human presence is detected based on the scan. Determining 630 whether a human presence is detected may include detecting a head zone in the scan. For example, if a head zone is detected, the system determines 630 that a human being is present at the client device, and if a head zone is not detected, the system determines 630 that a human being is not present at the client device. If it is determined 630 that a human presence is not detected, the method 500 includes transmitting 640 a notification. In some cases, the presence status may be updated to unavailable. The notification may include an indication of the presence status. The method 500 includes retaining 650 a call at a second device or forwarding the call to a mailbox, such as a voice mailbox of the user.

If it is determined 630 that a human presence is detected, the method 600 includes determining 660 an identity of the detected human. The identity of the detected human may be determined 660 using an AI tool trained for face detection, for example. Other examples of determining 660 the identity of the user may include performing voice print matching, fingerprint scanning, iris scanning, or some other biometric technique that does not require the use of image or video data.

The method 600 includes confirming 670 the identity of the detected human. For example, the identity of the detected human may be confirmed 670 by matching it against an identity of the person for whom the call is intended. The identity of the person for whom the call is intended may be a known identity, for example, stored in a database of the system that correlates image data, video data, or both, with a user account of the user. If the identity of the detected human matches the identity of the person for whom the call is intended, the identity is confirmed and the method 600 includes transmitting 680 a notification. In some cases, the presence status may be to available. The notification may include an indication of the presence status, and the notification may be based on the selected privacy setting. In some cases, the notification may include an identity of the user, an image of the user from the camera, or a video feed of the user from the camera based on the selected privacy setting. The method 600 includes transferring 690 a call from the second device to the client device in response to the notification.

If the identity of the detected user is not confirmed, for example in the case of a human other than the user is detected at the client device, the method 600 includes transmitting 640 a notification and updating a presence status to unavailable. The notification may include an indication of the updated presence status. The notification may indicate that the detected human is not the user the call was intended for. In some cases, the notification may be an alert that indicates that the detected human is an unauthorized user. The method 500 includes retaining 650 a call at the operator or forwarding the call to a mailbox, such as a voice mailbox of the user.

FIG. 7 is a flowchart of an example of another method 700 for video-assisted presence detection in telephony communications. The method 700 includes detecting 710 a user presence. The user presence may be detected based on data captured by a camera of a first device. The first device may be associated with a private network. The first device may be configured to communicate via a UCaaS platform, such as software platform 300 shown in FIG. 3. The data captured by the camera of the first device may include image data, video data, or both. Detection of the user presence may be based on a determination of a head zone, a body zone, or both, from the data captured by the camera of the first device. The head zone, the body zone, or both, may be determined by the first device or another device associated with the private network.

The method 700 includes transmitting 720 a notification to a second device. The second device may be associated with the private network. The second device may be configured to communicate via the UCaaS platform. The notification may indicate the detection of the user presence. The notification may include an indication of whether a user is available or not, image data from the camera of the first device, video data, such as a video feed, from the camera of the first device, or any combination thereof. The notification may be displayed on a display of the second device. In some cases, the notification is transmitted when the identity of the user is confirmed, such as by using a voice print matching procedure, fingerprint authentication, or another identity confirmation procedure.

The method 700 includes transferring 730 a call to the first device. The call may be transferred to the first device based on the detection of the user presence. The call may be transferred to the first device using SIP signaling. The call may be transferred based on an identity confirmation of the detected user. For example, a voice print matching procedure may be performed to confirm the identity of the user. If a result of the voice print matching procedure confirms that the detected user is the user for which the call is intended, the call is transferred to the first device.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
   a first device associated with a private network and configured to communicate via a unified communications as a service (UCaaS) platform;
   a second device associated with the private network and configured to communicate via the UCaaS platform, the second device including a camera, wherein the second device is configured to:
   detect, based on an indication of a call received from the first device, a user presence based on data captured by the camera; and
   transmit, to the first device, a notification that indicates detection of the user presence without the data captured by the camera, wherein the first device is configured to transfer the call to the second device based on the detection of the user presence using session initiation protocol (SIP) signaling.

2. The system of claim 1, wherein the second device is configured to determine a head zone from the data to detect the user presence at the second device, and wherein the head zone is a first area of an image associated with the data that includes at least a portion of a head of a user.

3. The system of claim 1, wherein the second device is configured to determine a head zone from the data to detect the user presence at the second device, wherein the head zone is a first area of an image associated with the data that includes at least a portion of a head of a user, wherein the second device is configured to determine a body zone from the data to detect the user presence at the second device, and wherein the body zone is a second area of the image associated with the data that includes at least a portion of a body of the user.

4. The system of claim 1, wherein the notification includes a video feed associated with the data.

5. The system of claim 1, wherein the second device is configured to perform voice print matching to confirm an identity of the user.

6. The system of claim 1, wherein the second device is configured to perform voice print matching to confirm an identity of the user, and wherein the second device is configured to transmit the notification on a condition that the identity of the user is confirmed.

7. A method comprising:
   detecting, based on an indication of a call received from a first device, a user presence at a second device based on data captured by a camera of the second device associated with a private network and configured to communicate via a unified communications as a service (UCaaS) platform;
   transmitting a notification to the first device associated with the private network and configured to communicate via the UCaaS platform, wherein the notification indicates the detected user presence without the data captured by the camera; and
   transferring, using session initiation protocol (SIP) signaling, the call to the second device based on the detection of the user presence.

8. The method of claim 7, wherein the indication of the call includes metadata associated with the call.

9. The method of claim 7, wherein the indication of the call includes a request for a user status.

10. The method of claim 7, further comprising:
determining, at a network device of the private network, a head zone from the data to detect the user presence at the first device, wherein the head zone is a first area of an image associated with the data that includes at least a portion of a head of a user.

11. The method of claim 7, further comprising:
determining, at a network device of the private network, a head zone from the data to detect the user presence at the first device, wherein the head zone is a first area of an image associated with the data that includes at least a portion of a head of a user; and
determining, at the network device of the private network, a body zone from the data to detect the user presence at the first device, wherein the body zone is a second area of the image associated with the data that includes at least a portion of a body of the user.

12. The method of claim 7, wherein the notification includes a video feed associated with the data.

13. The method of claim 7, further comprising:
performing, at the second device, voice print matching to confirm an identity of the user.

14. The method of claim 7, further comprising:
performing, at the second device, voice print matching to confirm an identity of the user, wherein the notification is transmitted on a condition that the identity of the user is confirmed.

15. A non-transitory computer-readable medium configured to store instructions that when executed by a processor cause the processor to:
detect, based on an indication of a call received from a first device, a user presence at a second device based on data captured by a camera of the second device associated with a private network and configured to communicate via a unified communications as a service (UCaaS) platform;
transmit a notification to the first device associated with the private network and configured to communicate via the UCaaS platform, wherein the notification indicates the detected user presence without the data captured by the camera; and
transfer, using session initiation protocol (SIP) signaling, the call to the second device based on the detection of the user presence.

16. The non-transitory computer-readable medium of claim 15, wherein the processor is configured to determine an identity of a user based on the data obtained from the camera of the second device.

17. The non-transitory computer-readable medium of claim 15, wherein the processor is configured to determine an identity of a user based on the data obtained from the camera of the second device, and wherein the processor is configured to confirm the identity of the user by matching the identity against a known identity.

18. The non-transitory computer-readable medium of claim 15, wherein the processor is configured to:
determine an identity of a user based on the data obtained from the camera of the second device;
confirm the identity of the user by matching the identity against a known identity, and
transfer the call to the second device based on the detection of the user presence.

19. The non-transitory computer-readable medium of claim 15, wherein the data captured by the camera is based on a privacy setting that allows partial access to the camera to perform a scan without capturing facial information.

20. The non-transitory computer-readable medium of claim 15, wherein the data captured by the camera is based on a privacy setting that allows full access to the camera, and wherein the notification includes a video feed from the camera.

* * * * *